United States Patent [19]

Witt

[11] 4,204,023
[45] May 20, 1980

[54] MIXED SULFONATED EMULSIFYING AGENTS USED TO PRODUCE ADHESIVE COMPOSITIONS FROM ACRYLIC MONOMERS AND ADHESIVE TAPE USING THE COMPOSITIONS

[75] Inventor: Edward Witt, Framingham, Mass.

[73] Assignee: The Kendall Company, Boston, Mass.

[21] Appl. No.: 922,553

[22] Filed: Jul. 7, 1978

[51] Int. Cl.$^2$ ................................................. C09J 7/02
[52] U.S. Cl. ........................... 428/355; 260/29.6 MQ; 260/29.6 T; 260/29.6 TA; 260/29.6 Z; 526/209; 526/222
[58] Field of Search ................... 260/29.6 T, 29.6 TA, 260/29.6 E, 29.6 Z, 29.6 MQ; 526/209, 222; 428/355

[56] References Cited

U.S. PATENT DOCUMENTS

| | | | |
|---|---|---|---|
| 3,736,287 | 5/1973 | Patella | 260/29.6 E |
| 3,879,326 | 4/1975 | Burke | 260/29.6 MQ |
| 3,900,674 | 8/1975 | Coffman | 428/355 |
| 3,947,400 | 3/1976 | Burkhard et al. | 260/29.6 MQ |
| 3,951,883 | 4/1976 | Ruchlak et al. | 260/29.6 MQ |
| 3,960,584 | 6/1976 | Savage | 260/29.6 E |
| 3,974,118 | 8/1976 | Samways et al. | 260/29.6 E |
| 4,024,097 | 5/1977 | Slovinsky et al. | 260/29.6 Z |
| 4,064,081 | 12/1977 | McCoy | 260/29.6 MQ |
| 4,074,004 | 2/1978 | Bateson et al. | 428/355 |
| 4,093,581 | 6/1978 | Anderson | 260/29.6 MQ |
| 4,150,210 | 4/1979 | Anderson et al. | 526/222 |

Primary Examiner—J. C. Cannon
Attorney, Agent, or Firm—Sherman and Shalloway

[57] ABSTRACT

An adhesive composition and an adhesive tape comprising a substrate and such adhesive composition are provided. The adhesive composition comprises the product of the polymerization of acrylic monomers in an aqueous system containing an emulsifying agent which comprises a mixture of (a) a sulfonated diphenyl ether and (b) a sulfonated reaction product of formaldehyde and naphthalene.

13 Claims, 1 Drawing Figure

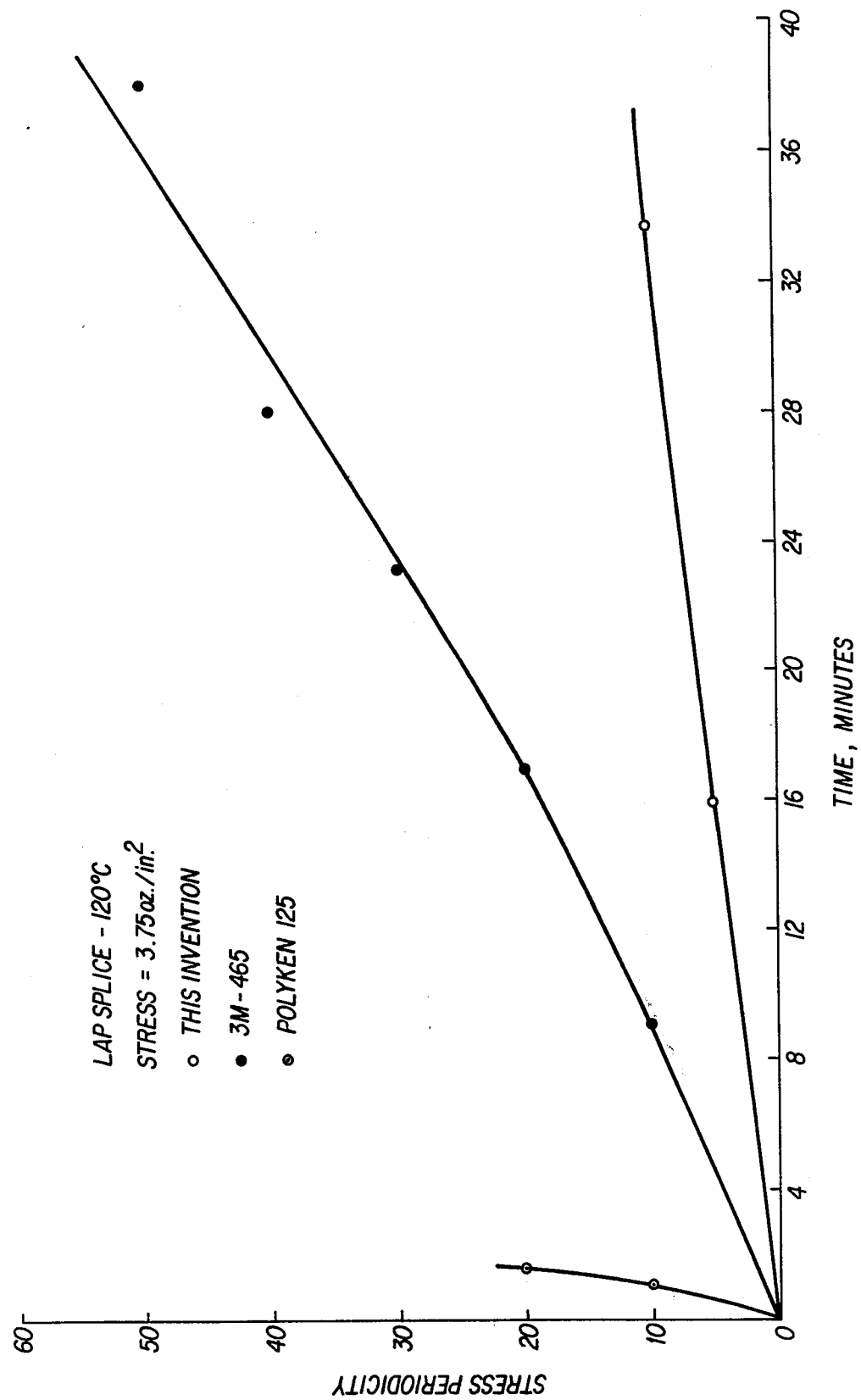

MIXED SULFONATED EMULSIFYING AGENTS USED TO PRODUCE ADHESIVE COMPOSITIONS FROM ACRYLIC MONOMERS AND ADHESIVE TAPE USING THE COMPOSITIONS

BACKGROUND OF THE INVENTION

1. Field of the Invention

This invention relates to adhesive compositions and a method of producing same. More particularly, this invention provides a pressure sensitive adhesive composition comprising the product of the emulsion polymerization of acrylic monomers and an emulsifying agent. In addition, the present invention relates to a pressure sensitive adhesive tape comprising a substrate having at least one surface thereof coated with the present adhesive composition.

2. Description of the Prior Art

Many adhesive compositions have been suggested in the art for bonding materials such as wood, paper, fabric and the like, to each other or other materials. Various types of polymers have been used in adhesive recipes to accomplish these goals.

In formulating a latex adhesive composition for deposition on a substrate to produce a splicing tape for paper materials, the following characteristics are usually desired:

(a) The adhesive composition must be resistant to high temperatures, pressures and humidity.
(b) The amount of coagulum in the composition should be kept low so as to have a stable product.
(c) The amount of emulsifying agents should be kept low. The reason for this is that high emulsifier concentration leads to a water sensitive composition. If the splicing tape is to have high humidity resistance, it cannot be water sensitive. Thus, low emulsifier concentration in the composition is usually desired.
(d) The conversion of the monomers forming the adhesive to a polymerized product should for obvious reasons, be as high as possible.

While numerous attempts have been made to produce a splicing tape which satisfies all of the above requirements, the present inventor is not aware of any tape or adhesive composition in the prior art which fulfils such a need.

Thus, the present invention provides a pressure sensitive adhesive composition which is highly temperature, pressure and humidity resistant and low in coagulum and emulsifying agents. Furthermore, the conversion of the monomers to polymers is high (over 90%) in the present invention.

SUMMARY OF THE INVENTION

According to the present invention, an adhesive composition which is the product of the emulsion polymerization of acrylic monomers in an aqueous system containing an emulsifying agent is provided.

The present invention also provides an adhesive tape comprising the adhesive composition mentioned above, which tape is useful as a splicing tape, particularly for use in the manufacture of cardboard.

In addition, this invention provides a novel emulsifying agent for an adhesive composition which is the emulsion polymerization product of acrylic polymers in an aqueous system.

DESCRIPTION OF THE DRAWING

The FIGURE shows the relationship between stress periodicity, a function of bond strength and time for the present splicing tape and those for the prior art.

DETAILED DESCRIPTION OF THE INVENTION

Adhesive composition

The present adhesive composition comprises the product of emulsion polymerization of acrylic monomers in an aqueous system containing an emulsifying agent.

The polymerization reaction employed is of the delayed monomer addition type. To prepare the adhesive composition, a reactor is charged with a portion of a mixture of acrylic monomers. The formulation of the monomer mixture is as follows:

| Components | Weight % | | |
|---|---|---|---|
|  | Useful | Preferred | Most Preferred |
| 2 ethyhexylacrylate | 50–95 | 75–90 | 80.0 |
| Ethyl acrylate | 4–40 | 8–20 | 15.5 |
| Acrylonitrile | 0.5–5 | 1–4 | 2.5 |
| Acrylic acid | 0.5–5 | 1–3 | 2.0 |

The charge to the reactor comprises:

| Component | Useful | Preferred | Most Preferred |
|---|---|---|---|
| Water | 65–150 phm | 80–100 phm | 90 phm* |
| Emulsifier (A)** | 0.2–2.0 phm | 0.4–0.7 phm | 0.5 phm |
| Emulsifier (B) | 0.1–1.0 phm | 0.4–0.7 phm | 0.5 phm |
| Monomer (% of total monomer charge) | 5–25% | 0.5–15% | 10 % |

*phm = parts per hundred of monomers
**45% active

Emulsifier (A) is a sulfonated diphenyl ether. A suitable example is DOWFAX 2A-1 made by the Dow Chemical Co., having the following structure:

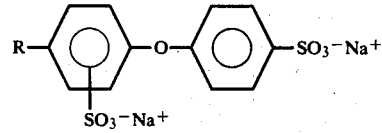

wherein R is a branched $C_{12}$

Emulsifier (B) is a sulfonated reaction product of formaldehyde and naphthalene. A suitable example is DAXAD 11, a product of Dewey and Almy, Div. of W. R. Grace Co. Other examples of Emulsifier (B) include:

Tamol N, Tamol SN—products of Rohm + Haas

The weight ratio of Emulsifier (A) to Emulsifier (B) is from about 5:1 to about 1:5, with from about 2:1 to about 1:2 being preferred and about 1.6:1 being most preferred.

The charge is heated to about 50° to 65° C., with 55°–60° being preferred.

An inert gas purge is maintained in the reactor.

To initiate the polymerization reaction, a persulfate solution and bisulfite solution are added to the reactor. The amounts of these solutions which may be used are:

for the persulfate, from about 0.02 to about 0.08 phm, with from about 0.05 to about 0.07 phm being preferred;

for the bisulfite, from about 0.01 phm to about 0.05 phm, with from about 0.02 to about 0.04 phm being preferred.

Suitable persulfates and bisulfites include the alkali metal salts. Specific examples are potassium persulfate and sodium bisulfite.

An exothermal reaction is produced. The remainder of the monomers is added continuously to the reactor over 1½ to 2 hours. The internal temperature of the reactor is maintained at about 65° to 75° C. during the major portion of the reaction. The batch temperature may be permitted to rise to as high as 85° C. at the end of the reaction without any deleterious effects on the latex stability or properties. This higher temperature range of 80°–85° C. is also useful in completing the polymerization reaction.

Additional amounts of the persulfate and Emulsifier (A) are added during the course of the polymerization reaction. The amount of persulfate to be added is from about 0.17 to about 0.23 phm, with from about 0.18 to 0.20 phm being preferred. The persulfate is added, in equal portions, when ¼, ½ and all of the remaining monomers have been added to the reactor. The amount of Emulsifier (A) to be added is from about 0.10 to about 1.0 phm, with from about 0.10 to about 0.30 phm being preferred. Emulsifier (A) is added in equal portions when ¼ and ¾ of the monomers have been charged into the reactor.

It has been found that the persulfate solution can be added continuously along with the monomers. In this case, Emulsifier (A) solution is added, in equal portions, when ¼ and ¾ of the total monomers have been added in order to obtain a stable latex.

The conversion of monomers into polymers is more than 90%, principally greater than 99%.

In the above process, it is important that Emulsifier (B) solution be present at the initiation of the polymerization reaction and that Emulsifier (A) solution is added at various intervals in the course of the reaction so as to obtain a product having maximum stability. By following the above procedure, the pre-floc level in the latex has been found to be negligible and the latex viscosity is greatly reduced, by as much as a factor of 5, thus allowing improved agitation and heat transfer.

It is also of interest to note that both Emulsifiers (A) and (B) must be used to form the emulsifying agent. The absence of either one will produce unsatisfactory results. If Emulsifier (A) is used alone, pre-floc or coagulum, which is undesirable, is present in the product. On the other hand, when Emulsifier (B) is used alone, either high coagulum level or low conversion is obtained. Thus, it is of primary importance that both Emulsifiers (A) and (B) are present in the adhesive composition.

The resultant adhesive composition has the following formulation:

| Components | Parts by Weight | | |
|---|---|---|---|
| | Useful | Preferred | Most Preferred |
| Monomers | 100.00 | 100.00 | 100.00 |
| Emulsifier (A)* | 0.3–3.0 | 0.5–1.0 | 0.80 |
| Emulsifier (B) | 0.01–1.0 | 0.3–0.7 | 0.50 |
| Water | 65–230 | 100–150 | 102.50 |
| Persulfate | 0.15–0.5 | 0.2–0.3 | 0.25 |
| Bisulfite | 0–0.15 | 0.01–0.05 | 0.03 |

*45% active

ADHESIVE TAPE

The adhesive composition obtained according to the above described process is used to form adhesive tapes. The adhesive tapes produced may be transfer tapes, i.e. without supporting membranes, wherein the adhesive composition is spread directly onto release papers. However, it is preferred to deposit the adhesive on a substrate as a reinforcement. One or both surfaces of the substrate may be coated. Suitable substrates include MYLAR, CEREX and REMAY. MYLAR is a product of E. I. DuPont de Nemours & Co. and is a water-repellent film of polyethylene terephthalate resin. For MYLAR, the adhesive composition may be applied thereto via a standard two pass system. CEREX is a product of the Monsanto Co. and is a spun bonded NYLON. The weight per square yard of CEREX which may be used in the present invention ranges from about 0.3 to about 2.0 oz/yd$^2$, with from about 0.3 to about 0.5 oz/yd$^2$ being preferred. The most preferred weight is 0.3 oz/yd$^2$. As to REMAY, it is a product of E. I. DuPont de Nemours & Co. comprising a spun bonded polyester. Suitable weight per area ranges from about 0.4 to about 2.0 oz/yd$^2$, while from about 0.4 to about 0.6 oz/yd$^2$ is preferred. The most preferred weight is 0.4 oz/yd$^2$. For CEREX and REMAY, the adhesive composition may be deposited by both the two pass and one pass systems. Since both of these substrate materials are porous, it has been found that sufficient adhesive can be deposited in a one pass system.

The adhesive tape of this invention is particularly useful in splicing cardboard.

It has been found that in manufacturing the present adhesive tape, it is necessary to increase the viscosity of the adhesive composition to about 5000 cp. To accomplish this, a thickener is added to the composition. Useful thickeners include ACRYSOL ASE 95 (Rohm and Haas), 68-710 (Reichold Chemicals Inc.) The thickening procedure is as follows:

(1) the pH is first adjusted to about 5 with ammonium hydroxide. Thereafter, the thickening agent is added. The pH is then adjusted to between about 8 to about 8.5. Usually, about 3–8 ml of ACRYSOL per pound of the adhesive composition is required to increase the viscosity to about 5000 cp. The amount of thickener used appears to depend on the latex particle size and distribution. The broader the particle distribution and larger particle size, a higher amount of thickener is required.

The thickness of the adhesive coating deposited on the substrate may be varied as desired. However, it has been found that the preferred thickness ranges from about 1.0 to about 2.5 mils, with from about 1.5 to about 1.8 mils being more preferred.

The adhesive tape of this invention, regardless of whether it is formed by the one- or two-pass method may be caused to have one of the adhesive surfaces to come into intimate contact with a release paper.

EXAMPLES

The present invention is further illustrated in the following examples. However, it must be noted that the examples are merely for illustrative purposes and should not be construed to be limiting the instant invention.

EXAMPLE 1

An adhesive composition having a final recipe shown below is prepared:

| | |
|---|---|
| 2 ethylhexyacrylate | 80.0 parts |
| Ethyl acrylate | 15.5 |
| Acrylonitrile | 2.5 |
| Acrylic acid | 2.0 |
| Water | 102.5 |
| 45% active DOWFAX 2A-1 | 0.8 |
| DAXAD 11 | 0.5 |
| $K_2S_2O_8$ | 0.25 |
| $NaHSO_3$ | 0.03 |
| In preparing the adhesive, a reactor is charged with: | |
| Monomer (% of total monomer charge) | 10 |
| Water | 90 phm |
| 45% DOWFAX 2A-1 | 0.5 phm |
| DAXAD | 0.5 phm |

The charge is brought to a temperature of 55°–60° C. while a nitrogen purge is maintained. The polymerization reaction is initiated with 0.06 phm $K_2S_2O_8$ solution (0.06 g/ml) and 0.03 phm $NaHSO_3$ solution (0.03 g/ml). After the initial exotherme, the remaining monomers are added continuously over 1½ to 2 hours, with the internal temperature being maintained at 65°–70° C. throughout the major portion of the reaction.

The remaining $K_2S_2O_8$ and DOWFAX 2A-1 are added during the course of the polymerization reaction. Equal portions of $K_2S_2O_8$ are added when ¼, ¾ and all of the remaining monomers are added to the reactor. The balance of the DOWFAX 2A-1 solution is added, in equal quantities when ½ and ¾ of the monomers are added to the reactor.

The reaction product does not contain large amounts of floc although some fine floc is present. The percent solids is 45.8 and the conversion is 91.7%. The viscosity is 550 cp.

EXAMPLE 2

Example 1 is repeated to produce a product based on the following recipe:

| | |
|---|---|
| 2 ethylhexyalacrylate | 30.5 lb. |
| Ethyl acrylate | 5.9 |
| Acrylonitrile | 0.95 |
| Acrylic acid | 0.76 |
| Water | 40.2 |
| DOWFAX 2A-1 | 0.31 |
| DAXAD 11 | 0.19 |
| $K_2S_2O_8$ | 0.09 |
| $NaHSO_3$ | 0.01 |

The product contains 46.1% of solids and the monomer conversion is 95.6%. The latex viscosity is 200 cp.

EXAMPLE 3

Example 1 is repeated to obtain a product based on the following recipe:

| | |
|---|---|
| 2 ethylhexylacrylate | 30.5 lb. |
| Ethyl acrylate | 5.9 |
| Acrylonitrile | 0.95 |
| Acrylic acid | 0.76 |
| Water | 40.2 |
| DOWFAX 2A-1 | 0.31 |
| DAXAD 11 | 0.19 |
| $K_2S_2O_8$ | 0.09 |
| $NaHSO_3$ | 0.011 |

The product contains 46.6% solids and the monomer conversion is 96.7%. The latex viscosity is 132 cp.

EXAMPLE 4

A series of test runs is made to determine the effect of the concentration of DOWFAX 2A-1 on the adhesive composition. The procedure outlined in Example 1 is used, except that the concentrations of DOWFAX 2A-1 are varied and only DOWFAX 2A-1 is used in the emulsifier. The runs and results are summarized in Table 1.

Table 1

| Run No. | Concentration of DOWFAX 2A-1 (phm) | % coagulum | RVT Brookfield Viscosity #3 at 10 (ps) |
|---|---|---|---|
| 3-1 | 3 | 2.5 | — |
| 3-2 | 2 | >8 | — |
| 3-3 | 1.5 | 2.5 | — |
| 3-4 | 1.25[a] | 1.5 | 2400 |
| 3-5 | 1.0[b] | 0.8 | 2550 |
| 3-6 | 1.0 | 100 | .... |

[a] 1.0 phm added initially and 0.25 phm when 3/4 monomer have been added
[b] 0.5 phm added initially, 0.15 at 1/2, 0.15 at 3/4 and 0.2 when all monomers have been added As can be observed in Table 1, the concentration of DOWFAX 2A-1 is important with respect to latex stability, i.e. pre-floc or coagulum formation.

The results obtained in Runs 3-1 to 3-5 show that by using DOWFAX 2A-1 alone in the polymerization, pre-floc or coagulum is present in the final product.

EXAMPLE 5

A series of test runs is made to determine the effect of DAXAD 11 on the adhesive product. The procedure outlined in Example 1 is repeated, with the exception that no DOWFAX 2A-1 is used and various amounts of DAXAD 11 are employed. The results are summarized in Table II.

Table II

| Run No. | DAXAD 11, phm | % coagulum | % conversion |
|---|---|---|---|
| 4-1 | 0.5 | 21 | — |
| 4-2 | 1.0 | 32 | — |
| 4-3 | 2.5 | 32 | — |
| 4-4 | 5.0 | 4 | 68 |
| 4-5 | 10.0 | nil | 63 |
| 4.6 | 20.0 | — | nil |

The results shown in Table II indicate that when DAXAD 11 alone is used as the emulsifying agent, either high coagulum levels or low conversion is obtained. The concentration of DAXAD 11 must be kept high in order to maintain a low concentration of coagulum in the product. Also, Table II shows that the higher the concentration of DAXAD 11, the lower is the conversion of monomers.

EXAMPLE 6

A monomer mixture comprising

| | |
|---|---|
| 2 ethyl hexylacrylate | 160 parts |
| Ethyl acrylate | 31 |
| Acrylonitrile | 5 |
| Acrylic acid | 4 | is used to determine the effect of using different amounts of DAXAD 11 with a fixed amount of DOWFAX 2A-1.

The procedure set forth in Example 1 is repeated, using the above listed monomer mixture, 1.2 gm $K_2S_2O_8$ in 40 ml of water and 0.2 gm $NaHSO_3$ in 10 ml water are used. The amounts of DAXAD 11 used and the results obtained are summarized in Table III.

Table III

| Run No. | Parts of DAXAD used | Parts of DOWFAX 2A-1 Used | % coagulum | % conversion |
|---|---|---|---|---|
| 5-1 | 20 | 200 | nil | 63.1 |
| 5-2 | 40 | 200 | nil | nil |

The results in Table III show that high concentrations (i.e. >10 phm) of DAXAD 11 should not be used.

EXAMPLE 7

The thickened adhesive composition obtained in Example 1 is tested to determine whether it is shear sensitive. The RVT Brookfield Viscosity of the composition is determined and summarized as follows:

Table IV

| Run condition | Viscosity (cp) |
|---|---|
| #5 at 10 | 6800 |
| at 20 | 3840 |
| at 50 | 1856 |
| at 100 | 1088 |

The results in Table IV show that the composition is highly thixotropic, i.e. shear sensitive.

EXAMPLE 8

Transfer tapes (adhesive tapes without supporting films) are prepared by spreading the adhesive composition of Example 1 on several release papers using a 9 mil gap at 2 yds/min. The samples are evaluated for their adhesion to steel and liner release by applying the transfer tape to 1.5 mil MYLAR. The results are summarized in the following Table.

Table V

| Run No. | Release Paper | Adhesion to Steel (oz/in) | Adhesion to Liner (oz/in) |
|---|---|---|---|
| 6-1 | Daubert 2-80-KG-1/99A | 22 | 0.8 |
| 6-2 | Daubert 2-65-KG-1/99AM | 32 | 0.2 |
| 6-2A | Daubert 2-65-KG-1/99AM | 22 | 0.2 |
| 6-3 | Akrosil GL65 Brown UBL 5/10 | 25 | 0.2 |
| 6-4 | 3M #645 (Control) | 17 | 0.3 |

The release from the liner is found to be erratic, thus making it necessary to reinforce the adhesive by use of a support substrate.

EXAMPLE 9

Adhesive tapes are prepared by depositing the adhesive composition of Example 1 on MYLAR, CEREX and REMAY films, either a one pass or two pass deposition system is used. For the MYLAR, the adhesive is applied on both sides by a two pass process.

Several tests are conducted to determine the physical properties of the adhesive tapes. Properties tested include: tack level, probe tack, adhesion to steel and quick stick. Tack level is determined in accordance with the test procedure outlined in "Test Methods for Pressure Sensitive Tapes", 7th ed, Pressure Sensitive Tape Council, Glenview, Ill., 60025, at pages 28–29. According to this test, a steel ball is rolled down an inclined plane onto an adhesive tape. The distance travelled by the ball until it comes to a stop gives a measure of the tack level of the tape.

The results are summarized in Table VI.

Table VI

| Run No. | Backing | Tape Thickness | Tack Level Side 1 | Tack Level Side 2 | Probe Tack 100 g/cm Side 1 | Probe Tack 100 g/cm Side 2 | Adh. Steel (oz/in width) Side 1 | Adh. Steel (oz/in width) Side 2 | Quick Stick (oz/in width) Side 1 | Quick Stick (oz/in width) Side 2 |
|---|---|---|---|---|---|---|---|---|---|---|
| 7—1 | CEREX-2 pass | 5.0 mils | 4.0 | 4.6 | 122 | 138 | 13 | 14 | 10 | 9 |
| 7—2 | CEREX-1 pass | 4.0 | 4.2 | 4.3 | 132 | 122 | 11 | 14 | 13 | 7 |
| 7—3 | MYLAR-2 pass | 2.7 | 3.2 | 4.0 | 162 | 204 | 10 | 17 | 5 | 9 |
| 7—4 | REMAY- | 6.2 | 4.3 | 4.9 | — | 62 | 9 | 14 | — | — |

In Table VI, the higher tackiness is represented by a higher tack level.

EXAMPLE 10

Test runs are made to evaluate the use of the present adhesive composition as a cardboard splicing tape.

Two pieces of cardboard (2½"×5") are laminated with a 2" square piece of the tapes obtained in accordance with the invention. The samples are placed in a 120°–150° C. oven with a 1000 gm weight attached to the lower piece of cardboard. In essence, a static force of 250 g/in² is applied to the tape. The time elapsed between initiation of the application of the static force and failure is noted and summarized in Table VII.

Table VII

| Run No. | Type of Tape | Time elapsed |
|---|---|---|
| 8-1 | Transfer tape | >1 hr |
| 8-2 | CEREX - 2 pass (Run 7-1 of Ex. 9) | >1 hr |

Table VII-continued

| Run No. | Type of Tape | Time elapsed |
| --- | --- | --- |
| 8-3 | CEREX - 1 pass (Run 7-2 of Ex. 9) | >1 hr |
| 8-4 | MYLAR - 2 pass (Run 7-3 of Ex. 9) | >1 hr |
| 8-5 | REMAY - 1 pass (Run 7-4 of Ex. 9) | >1 hr |
| 8-6 | POLYKEN #125* | 30 sec |
| 8-7 | 3M 465** | 15 min |

*POLYKEN #125 is an acrylic adhesive splicing tape. A product of the Kendall Co.
** 3M 465 is an acrylic adhesive transfer/splicing tape. A product of the 3M company.

The data shown in Table VII clearly shows that the adhesive tape of this invention provides superior results. While the instant tapes hold the bond for greater than 1 hr, those formed from POLYKEN #125 and 3M 465 fail within very short periods of time (30 seconds and 15 minutes, respectively).

EXAMPLE 11

A splicing tape is prepared by depositing the adhesive composition of Example 1 on ¼ mil MYLAR. The physical properties of the tape are presented in the following Table VIII.

Table VIII

|  | This invention | | POLYKEN #125 | | 3M 465 | |
| --- | --- | --- | --- | --- | --- | --- |
|  | Side 1 | Side 2 | Side 1 | Side 2 | Side 1 | Side 2 |
| Total Thickness, mils | 3.9 | 5.9 | 2.9 | | 1.8 | |
| Tack Level | 4.7 | 5.9 | 3.8 | 4.3 | 5.1 | 4.2 |
| Probe Tack 100g/cm$^2$ | 172 | 298 | 372 | 374 | 306 | 354 |
| Adhesion Steel oz/in | 105 | 48 | 26 | 22 | — | 21 |
| Adhesion Cardboard oz/in | 84 | * | — | — | — | — |
| Quick Stick-Steel oz/in | 62 | 14 | 23 | 11.8 | — | 12.2 |

* Cardboard Tore

Splicing properties are evaluated in two modes, lap and butt lap slices. Cardboard boxes are cut into 2½"×4" pieces which are spliced with a 2"×2" piece of tape either by means of a lap splice or a butt-lap splice. The spliced pieces are then rolled once with a 10 lb weight and placed in a heated Instron Chamber maintained at either 120° or 150° C. After conditioning for 30 sec, a constant stress is applied and maintained automatically by the Instron. Stresses of 15, 30 and 75 oz are applied to the 4 square inch splice. The time to failure $T_F$ of the splice is noted and presented in the following Table IX.

Table IX

| Run No. | | Applied Stress (oz/in$^2$) | $T_F$, Lap Splice (min) | | $T_F$, Butt/Lap Splice (min) | |
| --- | --- | --- | --- | --- | --- | --- |
| | | | (120° C.) | (150° C.) | (120° C.) | (150° C.) |
| Run 9-1 | This invention | 3.75 | >60 | >60 | >60 | >60 |
| | POLYKEN #125 | 3.75 | 1.2 | 1.2 | 41.8 | 4.5 |
| | 3M-464 | 3.75 | >60 | 8.0 | 16.6 | 3.8 |
| Run 9-2 | This invention | 7.50 | >60 | >60 | >60 | >60 |
| | POLYKEN #125 | 7.50 | 0.7 | 0.4 | 4.0 | 2.4 |
| | 3M-465 | 7.50 | 43 | 4.1 | 3.4 | 1.0 |
| Run 9-3 | This invention | 18.75 | >60 | 8.2 | 6.1 | 2.5 |
| | POLYKEN #125 | 18.75 | 0.3 | 0.1 | 0.4 | 0.3 |
| | 3M-465 | 18.75 | 3.1 | 1.4 | 0.6 | 0.6 |

The data presented in Table IX show that the present splicing tape produces a much stronger splice than either the POLYKEN #125 or 3M-465 adhesive tapes. It should be noted that the above tests are terminated after 60 minutes even if the splice has not yet failed. It is apparent that the 3M-465 tape exceeds the cut-off time of 1 hr only when a low stress (3.75 oz/in$^2$) and low temperature (120° C.) are used.

In addition, a measure of the bond slippage or strength as measured by the automatic application of stress is obtained. In other words, as the applied stress decays due to bond slippage, the crosshead of the Instron moves sufficiently to reimpose the desired stress. As a result, a peak in the stress trace is obtained. This stress periodicity is a function of the bond strength. As the bond strength decreases, the stress periodicity increases. FIG. 1 illustrates the relationship between stress periodicity and time. As can be observed from the figure, the POLYKEN #125 and 3M-465 tapes show high stress periodicity, thus indicating that a much weaker bond is obtained in these tapes than in the tape of the present invention.

EXAMPLE 12

The stress applied to the splices in Example 11 is increased to 20 oz/in$^2$, with the rate of application being increased from 0.1 in/min to 10 in/min so as to approximate the sudden stresses applied to the splice in actual use operations. The splices produced with the POLYKEN 125 and 3M-465 tapes fail immediately without obtaining the full applied stress. On the other hand, the splice formed with the present tape maintaines a bond with a $T_F$ of about 35 minutes.

EXAMPLE 13

In this Example, the effect of using emulsifiers different from those of this invention is determined.

Three adhesive compositions (Table X) are obtained by using 2.25 phm MES* as the emulsifier and 0.00136 phm Fe $(NH_4)_2(SO_4)_2.6H_2O$, 0.07 phm sodium formaldehyde sulfoxylate, and 0.2 phm t-butylhydroperoxide as the catalyst system. Polymerization is carried out at 50° C. and the conversions range from 90 to over 95%. Splicing tapes are formed from these adhesives and the physical properties thereof are summarized in Table XI.
*Monomeric Emulsion Stabilizer—A product of The Kendall Co.

Table X

| | Run 11-1 | Run 11-2 | Run 11-3 |
| --- | --- | --- | --- |
| 2 ethylhexylacrylate | 80.0 | 80.0 | 90.0 |
| Ethyl acrylate | 15.5 | 13.5 | 5.5 |
| Acrylonitrile | 2.5 | 2.5 | 2.5 |
| Acrylic acid | 2.0 | 4.0 | 2.0 |

Table XI

| | Run 11-1 | Run 11-2 | Run 11-3 |
| --- | --- | --- | --- |
| Thickness, mils | 0.6 | 1.1 | 1.1 |

Table XI-continued

| | Run 11-1 | Run 11-2 | Run 11-3 |
|---|---|---|---|
| Tack | 3.1 | 2.4 | 3.2 |
| Probe tack, g/cm$^2$ | 302 | 482 | 444 |
| Steel adhesive (oz/in) | 17 | 30.5 | 21.5 |
| Quick stick (oz/in) | 21 | 16 | 16 |

The samples are evaluated in a butt/lap splice at 120° C. using an applied stress of 18.75 oz/in$^2$. The results are shown in Table XIII.

Table XIII

| Run No. | $T_F$, min |
|---|---|
| 11-1 | 1.4 |
| 11-2 | 0.8 |
| 11-3 | 0.6 |

From Table XIII, it can be observed that Run 11-1, which comprises the adhesive composition of this invention, except a different emulsifying agent is used, a $T_F$ of 1.4 minutes is obtained which is far inferior to 6.1 minutes obtained in Run 9-3 identical experimental conditions.

What is claimed is:

1. An adhesive composition comprising the product of emulsion polymerization of a mixture of acrylic monomers containing an emulsifier agent, the emulsifying agent comprising a mixture of (a) a sulfonated diphenyl ether and (b) a sulfonated reaction product of formaldehyde and napthalene.

2. The adhesive composition of claim 1 wherein the weight ratio of (a) to (b) is from about 5:1 to about 1:5.

3. The adhesive composition of claim 1 wherein the weight ratio of (a) to (b) is from about 2:1 to about 1:2.

4. The adhesive composition of claim 1 wherein the monomer mixture comprises, by weight, about 50-95% 2-ethylhexylacrylate, about 4-40% ethylacrylate, about 0.5-5% acrylonitrile, and about 0.5-5% acrylic acid.

5. The adhesive composition of claim 1 wherein the emulsifier agent comprises, by weight, about 0.2-2.0 parts of (a) and about 0.1-1.0 parts of (b) per 100 parts of monomers.

6. A pressure sensitive adhesive tape comprising a substrate having an adhesive composition deposited on at least one surface thereof, the adhesive composition comprising the product of emulsion polymerization of acrylic monomers in an aqueous system containing an emulsifier agent, the emulsifying agent comprising a mixture of (a) a sulfonated diphenyl ether and (b) a sulfonated reaction product of formaldehyde and naphthalene.

7. The adhesive tape of claim 6 wherein the weight ratio of (a) to (b) is from about 5:1 to about 1:5.

8. The adhesive tape of claim 6 wherein the monomer mixture comprises, by weight, about 80% 2-ethylhexylacrylate, about 15.5% ethyl acrylate, about 2.5% acrylonitrile, and about 2.0% acrylic acid.

9. The adhesive tape of claim 6 wherein the weight ratio of (a) to (b) is from about 2:1 to about 1:2.

10. The adhesive tape of claim 6 wherein the monomer mixture comprises, by weight, about 50-95% 2-ethylhexylacrylate, about 4-40% ethylacrylate, about 0.5-5% acrylonitrile and about 0.5-5% acrylic acid.

11. The adhesive tape of claim 6 wherein the emulsifier agent comprises, by weight, about 0.2-2.0 parts of (a) and about 0.1-1.0 parts of (b) per 100 parts of monomers.

12. The adhesive tape of claim 8 wherein the emulsifier agent comprises, by weight, about 0.8 parts of (a) and about 0.5 parts of (b) per 100 parts of monomers.

13. A process for the emulsion polymerization of acrylic monomers in an aqueous system comprising: charging to a reactor, a first portion of a monomer mixture comprising 2-ethylhexylacrylate, ethyl acrylate, acrylonitrile, and acrylic acid, water and a first portion of an emulsifying agent comprising a mixture of (a) a sulfonated diphenyl ether and (b) a sulfonated reaction product of formaldehyde and naphthalene; initiating polymerization by adding to the reactor a catalyst comprising an alkali metal persulfate and an alkali metal bisulfite; adding the remaining portions of the monomer mixture and emulsifying agent in equal portions to complete the polymerization reaction.

* * * * *